(12) United States Patent
Severson et al.

(10) Patent No.: US 9,727,850 B2
(45) Date of Patent: Aug. 8, 2017

(54) SECURE ELECTRONIC CASH-LESS PAYMENT SYSTEMS AND METHODS

(75) Inventors: Verne Severson, Jordan, MN (US); David Stark, Lakeville, MN (US)

(73) Assignee: Forward Pay Systems, Inc., Eden Prairie, MN (US)

( * ) Notice: Subject to any disclaimer, the term of this patent is extended or adjusted under 35 U.S.C. 154(b) by 1227 days.

(21) Appl. No.: 13/074,905

(22) Filed: Mar. 29, 2011

(65) Prior Publication Data

US 2011/0238581 A1 Sep. 29, 2011

Related U.S. Application Data

(60) Provisional application No. 61/318,632, filed on Mar. 29, 2010.

(51) Int. Cl.
| | |
|---|---|
| G06Q 20/00 | (2012.01) |
| G06Q 20/18 | (2012.01) |
| G06Q 20/04 | (2012.01) |
| G06Q 20/36 | (2012.01) |
| G06Q 20/38 | (2012.01) |
| G07F 7/08 | (2006.01) |
| G07F 7/12 | (2006.01) |

(52) U.S. Cl.
CPC ............ *G06Q 20/18* (2013.01); *G06Q 20/04* (2013.01); *G06Q 20/367* (2013.01); *G06Q 20/3674* (2013.01); *G06Q 20/3823* (2013.01); *G07F 7/0873* (2013.01); *G07F 7/122* (2013.01)

(58) Field of Classification Search
USPC ........................................................ 705/67
See application file for complete search history.

(56) References Cited

U.S. PATENT DOCUMENTS

| | | | |
|---|---|---|---|
| 5,769,269 A | 6/1998 | Peters | |
| 5,864,620 A | 1/1999 | Pettitt | |
| 5,892,900 A * | 4/1999 | Ginter et al. ................... | 726/26 |
| 5,933,497 A | 8/1999 | Beetcher | |
| 5,949,876 A | 9/1999 | Ginter | |
| 5,959,869 A | 9/1999 | Miller et al. | |
| 5,982,889 A | 11/1999 | Demont | |
| 6,134,324 A | 10/2000 | Bohannon | |

(Continued)

OTHER PUBLICATIONS

RFC 1321: Engineering Task Foce Document. "The MD5 Message Digest Algorithm," dated Apr. 1992, 18 pages.

(Continued)

*Primary Examiner* — Calvin L Hewitt, II
*Assistant Examiner* — C. Aaron McIntyre
(74) *Attorney, Agent, or Firm* — Patterson Thuente Pedersen, P.A.

(57) ABSTRACT

Systems and methods to provide and maintain secure financial transaction conducted with a credit card or other cashless payment mechanism at a vending machine or other potentially unattended vending or point of sale device. Encapsulated card readers providing end-to-end encryption capabilities encrypt transaction data for secure transmission to a transaction host or server. Pre-authorization transaction data checking maintains account numbers in a secure encrypted format further enhancing security. Protection mechanisms that guard against, and provide warnings of equipment tampering, while also providing a visual indication to customers regarding the security of the system.

13 Claims, 14 Drawing Sheets

(56) References Cited

U.S. PATENT DOCUMENTS

| | | | |
|---|---|---|---|
| 6,173,403 B1 | 1/2001 | Demont | |
| 6,367,695 B1 | 4/2002 | Mair et al. | |
| 6,390,367 B1 | 5/2002 | Doig | |
| 6,422,475 B1 | 7/2002 | May | |
| 6,830,182 B2 | 12/2004 | Izuyama | |
| 7,229,009 B1 | 6/2007 | Parsons et al. | |
| 7,309,012 B2 | 12/2007 | von Mueller et al. | |
| 7,422,475 B2 | 9/2008 | Hirata | |
| 7,506,812 B2 | 3/2009 | von Mueller et al. | |
| 7,543,151 B2 | 6/2009 | von Mueller et al. | |
| 7,543,739 B2 | 6/2009 | Brown et al. | |
| 7,568,621 B2 | 8/2009 | von Mueller et al. | |
| 7,602,909 B1 | 10/2009 | Shields | |
| 7,740,173 B2 | 6/2010 | von Mueller et al. | |
| 8,249,993 B2 | 8/2012 | von Mueller | |
| 2005/0205675 A1* | 9/2005 | Savage | 235/436 |
| 2006/0118624 A1* | 6/2006 | Kelso et al. | 235/444 |
| 2007/0034691 A1* | 2/2007 | Davis et al. | 235/382 |
| 2007/0040023 A1* | 2/2007 | Ruggirello et al. | 235/382 |
| 2008/0046758 A1* | 2/2008 | Cha et al. | 713/189 |
| 2009/0048953 A1* | 2/2009 | Hazel et al. | 705/35 |
| 2009/0070583 A1* | 3/2009 | von Mueller et al. | 713/168 |
| 2009/0289105 A1* | 11/2009 | Block et al. | 235/379 |
| 2012/0080518 A1* | 4/2012 | Van Den Bogart et al. | 235/379 |

OTHER PUBLICATIONS

RFC 5246: Engineering Tasks Force Document "The Transport Layer Security (TLS) Protocol, Version 1.2," dated Aug. 2008, 105 pages.

Timothy Stapko, Practical Embedded Security: Building Secure Resource—Constrained Systems (Embedded Technology), Newnes, 2007.

Siegel, et al., "Swiping is the Easy Part," http://www.nytimes.com/2011/03/24/technology/24wallet.htm?_r=1@emc=etal, dated Mar. 23, 2011, 3 pages.

* cited by examiner

Vulnerabilities in a Typical Cashless Electronic Payment System

The Secure Electronic Payment System Block Diagram.

Encapsulated Cryptographic Read Head Assembly for Magnetic Track Card Reader.

Encapsulated Cryptographic Read Head Assembly for Contact-less Card Reader.

Electronic Payment System Data Flow Block Diagram.

Track 2 card data:

Image:

| SS | Account Number | = | Expiry | Service Code | D. Data | ES | LRC |
|---|---|---|---|---|---|---|---|

Length:

| 1 | 4 - 19 characters | 1 | 4 | 3 | As required | 1 | 1 |
|---|---|---|---|---|---|---|---|

Preliminary card read data as sent to Network Access Controller (shown un-encrypted):

Name:

| SS | BIN | Masked | Last 5 | = | Expiry | Service Code | D. Data | ES | LRC | Serial Nbr | Checksum |
|---|---|---|---|---|---|---|---|---|---|---|---|

Length:

| 1 | 6 | As required | 5 | 1 | 4 | 3 | As required | 1 | 1 | 8 | 16 |
|---|---|---|---|---|---|---|---|---|---|---|---|

Example:

| ; | 543210 | * * * * * | 43210 | ? | 1301 | 101 | * * * * * .... | ? | 3C | 123....8 | 123....16 |
|---|---|---|---|---|---|---|---|---|---|---|---|

| Serial Number | The serial number of the card reader. |
|---|---|
| SS | Start Sentinel character ";" |
| BIN | BIN number portion of account number, first 6 digits |
| Masked | The masked off portion of the account number |
| Last 5 | The last 5 digits of the account number |
| = | The expiration date delimiter "=" |
| Expiry | The 4 character expiration date, YYMM. |
| Service Code | The three character service code. |
| D. Data | The extra characters at the end of the track data |
| ES | End sentinel character, "?" |
| LRC | Longitudinal redundancy character |
| Serial Number | The embedded serial number of the card reader. |
| Checksum | The checksum of the card reader firmware. |

FIG. 9

Secure Client Server Handshaking

Secure Insertion Reader

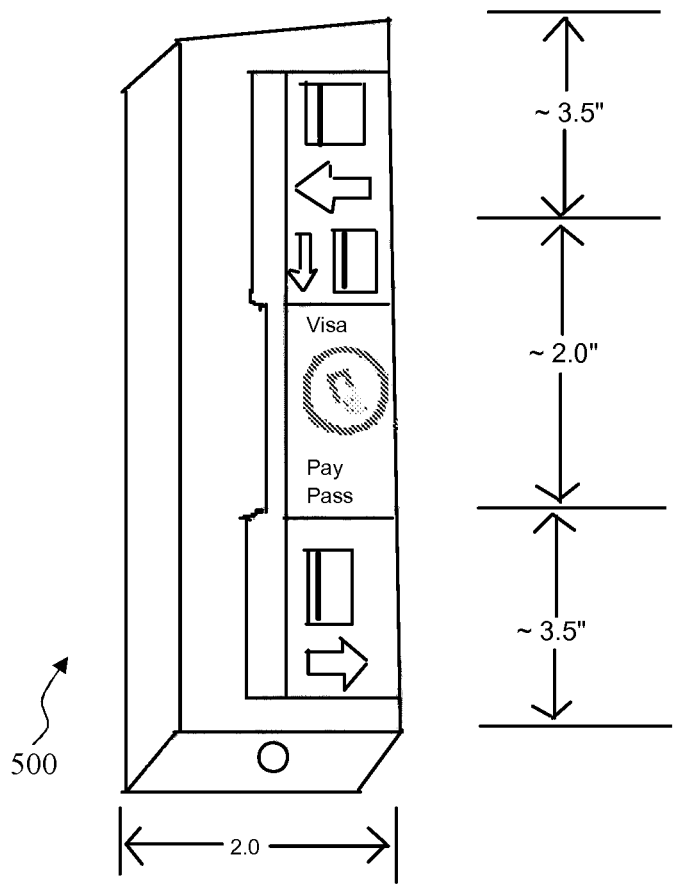
SKIMMING - RESISTANT SWIPE
CARD READER
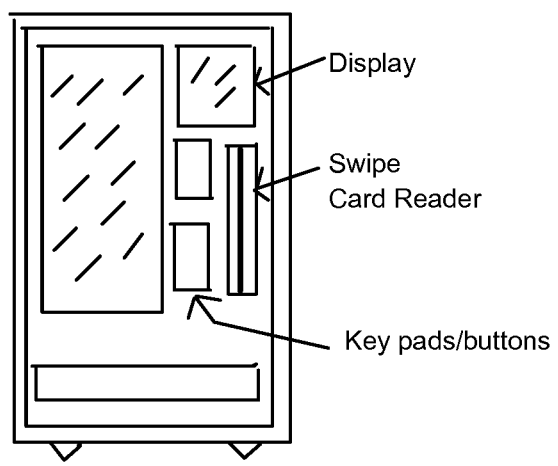
FIG. 12A

Secure Swipe Reader

SECURE ELECTRONIC CASH-LESS PAYMENT SYSTEMS AND METHODS

FIELD OF THE INVENTION

The present invention relates to the field of cashless transaction processing systems. More specifically, systems and methods are disclosed that provide, ensure, and maintain the security of financial transactions conducted with a credit card, electronic wallet, or other cashless payment mechanism at a vending machine or retail point of sale.

BACKGROUND OF THE INVENTION

The acceptance of cashless payments, such as credit, debit, pre-paid cards and mobile near field communication (NFC) payment readers, in unattended vending situations is becoming common. The first widespread use of unattended cashless payment systems was with gas pumps at filling stations. Other unattended vending situations include car-wash facilities, roadside truck weigh scales, public massage chairs, and video rental kiosks, among others. More recently, cashless payments are used in commodity vending machines such as food, bottled water, toiletries, etc.

The unattended vending situations described herein generally involve low cost items, typically priced under $20.00. However, there are also unattended vending machines deployed utilizing cashless payments that vend higher valued items such as digital music players, DVD players, headphones, phone chargers, digital cameras, portable gaming devices, flash drives, gift cards, etc.

By their very nature of being unattended, cashless payment transactions are susceptible to fraud or security breaches. A vending machine may be in an isolated area with no one watching and may be susceptible to tampering, modification, or other unintended and unauthorized manipulation. Even when the equipment is in a public area a person could access and tamper with vending equipment by posing as service personnel.

One of the key fraud problems involves the theft of account information from a credit card or other cashless payment mechanism. There are at least five ways to steal or skim account numbers from existing vending systems: (1) Internal Skimming Device that is attached internally in the equipment to electrically collect account numbers from the data stream; (2) External Skimming Device that electrically collects account numbers from the data stream exiting the cashless payment device going to the payment processor; (3) Detection of RF Energy that is emitted from a legitimate reader/processor device as the account number data travels internally through the equipment; (4) Hardware/Software Hacking of the actual card reader; and/or (5) False Front Device that is attached over the actual card reader to capture data from a magnetic stripe card as it is entering the "real" card reader and can sometimes also include nearby hidden cameras to capture entry of PIN data associated with the cashless payment mechanism.

One potential approach to at least some of the skimming type of security problems is to encrypt the account information. Currently, there are some solutions available that can encrypt the account numbers within an encryption engine at or near the card reader read head. MagTek and others, for example, provide a card reader with a proprietary encryption engine encapsulated within the read head. However, these solutions are inadequate or have disadvantages that are barriers to effective application of this approach in electronic cashless payment systems because the entire card image is either encrypted such that the local controller cannot get access to portions of the data that may not need to be secured as robustly as account information, such as the expiration date, BIN number, and service code, or such information is left completely unsecured and can still be attacked by a skimming fraud.

The other kinds of fraud besides skimming are often referred to as a "Trojan Horse" type of fraud based on either hacked hardware or software or on a false front for the vending machine card reader. Approaches for defeating this kind of fraud rely on mechanical/electrical security in the form of locks or passwords on the card reader hardware/software, or on a detection of a false front on the vending machine. A number of schemes for detecting a false front have been proposed. One scheme uses infrared light paths that can detect when material has been added to the front of the reader. Another scheme uses a metal sensor to detect additional electronics has been added to the front. If a false front is detected the ATM machine would be shut down causing the display to go blank, hopefully discouraging a user from attempting to use the card reader. The following patents describe prior attempts to implement false front detecting systems: U.S. Pat. No. 7,602,909 to Shields, U.S. Pat. No. 6,422,475 to May, and U.S. Pat. No. 6,367,695 to Mair.

Once a person has obtained a stolen payment media, or created one using skimmed account numbers, financial fraud is difficult to stop. A stolen or skimmed account number can be easily used at an unattended electronic cashless payment system since there is no personnel available to check for an identification or to verify a signature to ensure that the person holding the card or payment media is the account holder. As a result, this type of fraud represents a significant loss to merchants an there is need for a secure solution to skimming and Trojan Horse fraud for cashless payment systems for such unattended vending machines and the like.

SUMMARY OF THE INVENTION

Embodiments of the invention described herein include an electronic cashless payment system that is flexible such that it can be used in a wide variety of vending equipment, including computer-controlled equipment. Embodiments of the invention can provide a desired level of security appropriate for various financial transaction applications. Any payment type such as credit, debit, pre-paid cards, and mobile NFC payment readers can be included in embodiments of this invention. Alternate embodiments can include attended point of sale (POS) terminals that include electronic cashless payment transaction features. For example, an embodiment of the invention can include a credit card POS device on the counter of a retail store checkout lane.

The use of the term card reader can include any device that can read a personal payment media, including but not limited to, magnetic stripe cards, contactless payment cards, NFC devices, mobile or cellular devices, and smartcards. Various embodiments of the present invention can provide the following features:
  Provide a secure, workable, and flexible cashless payment system that can be used in conjunction with a wide variety of unattended payment equipment.
  Provide a secure cashless payment system that can be easily integrated into existing payment equipment.
  Provide a secure cashless payment system that can be used with an embedded or personal computer.
  Provide a secure cashless payment system that can resist internal skimming.

Provide a secure cashless payment system that can resist external, false front, skimming.

Provide a secure cashless payment system that can detect and indicate that a card reader component has been tampered with or replaced.

Provide a secure cashless payment system that can detect and generate an alarm if a card reader component is tampered with or replaced.

Provide a cashless payment system that is resistant to the use of counterfeit or fraudulently obtained account numbers.

Provide for the detection of tampering or attacks on the cashless payment system through a worldwide electronic network alert.

Provide for backup, communication capabilities, supplying an improved fail-safe detection and reporting mechanism.

In an embodiment of the invention, account data received at a card reader is encrypted at a read head that first receives the account data and maintains the data in an encrypted form along the entire path to an authorized financial transaction server. This end-to-end encryption can include embodiments of the Secure Sockets Layer (SSL)/Transport Layer Security (TLS) encryption scheme similar to the encryption techniques used to send on-line payment transactions to secure website payment servers. End-to-end encryption technologies other than SSL/TLS can also be included in various embodiments of the device. End-to-end encryption can eliminate the need to include systems that must go to an intermediate server to decrypt some or all of the account data, and then re-encrypt the data using an encryption scheme required by the transaction processor.

In an embodiment, card data that includes account information can be provided to the Network Access Controller before requesting that the read head send the fully encrypted data to the transaction server. This step allows the Network Access Controller to make certain preliminary decisions at the Network Access controller, such as determining the type of transaction or account type that is being presented and verifying that the presented card data can be processed by the system.

In an embodiment, a Payment Security Display Module (PSDM) is included as an additional device that can detect if the card reader has been replaced or temporarily removed from a system. This detection can indicate that the system has possibly been modified by an unauthorized individual, or that Trojan Horse mechanism could have been installed that would compromise the security of the system.

In an embodiment, a swipe reader assembly or an insertion reader assembly can provide resistance to the addition of skimming devices or other false front card readers by including blocking features or arranging the reader and other components to discourage or prevent the attachment of a skimming device.

In an embodiment, a monitoring server can be configured to receive alarm messages from a cashless payment system. The connection between the server and the cashless payment system provides a positive feedback loop to the entitled parties, which can provide immediate detection of tampering to the unattended cashless system. The monitoring server can also provide an interface to configure and enable alarm features, additional security configurations, and special instructions to one or more unattended payment systems or devices.

In an embodiment of the invention, an encapsulated reader device includes a read head that is configured to provide preliminary data to a network access controller. The read head is further configured to encrypt received card data and utilize SSL encryption to authenticate a transaction-processing host, negotiate encryption keys with the transaction-processing host, and send the encrypted transaction, including the encrypted card data from the read head to the transaction processing host.

In an embodiment, the read head includes a serial number that is unique to each read head device. The network access controller can check the serial number of the read head device before every transaction to determine if it has been changed, thereby eliminating the possibly that the read head device has been compromised due to tampering or unauthorized replacement.

In an embodiment, a secure reader for use with a cashless transaction system in an unattended vending machine includes a network access controller coupled over a network to a financial transaction processing server. The secure reader includes a read head configured to read financial account data from a cashless transaction device presented by a user, a display configured to present payment status information to the user, a tamper detector configured to detect tampering with the secure reader, and a microcontroller securely coupled to the read head, the display, the tamper detector and the network access controller. The microcontroller can be configured to present warning information to the user via the display in response to the tamper detector, transmit transaction information other than account information from the data from the cashless transaction device for use by the network access controller to initiate a financial transaction with the financial transaction processing server, and, in response to an encryption key provided by the financial transaction processing server for the financial transaction, encrypt financial information that includes the account information from the data from the cashless transaction device for secure communication without decryption by the network access controller to the financial transaction processing server.

The above summary of the invention is not intended to describe each illustrated embodiment or every implementation of the present invention. The figures and the detailed description that follow more particularly exemplify these embodiments.

BRIEF DESCRIPTION OF THE DRAWINGS

The embodiments of the present invention may be more completely understood in consideration of the following detailed description of various embodiments in connection with the accompanying drawings, in which:

FIG. 9 depicts an exemplary data record that can include masked card data.

FIGS. 12A & 12B depict an exemplary embodiment of a false-front resistant swipe card reader.

Figure 1:
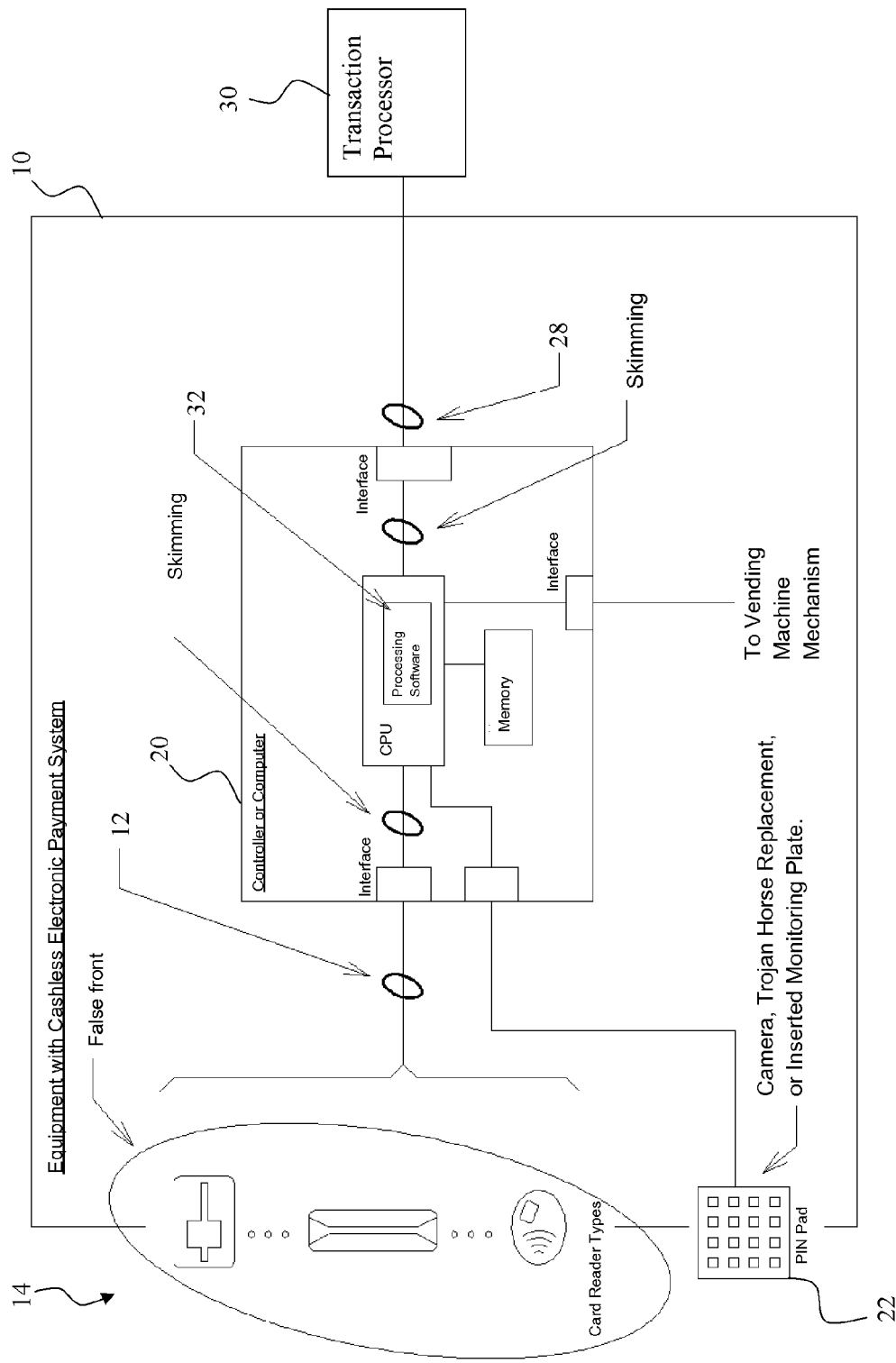
FIG. 1 is a block diagram of a typical cashless transaction system.

While the present invention is amenable to various modifications and alternative forms, specifics thereof have been shown by way of example in the drawings and will be described in detail. It should be understood, however, that the intention is not to limit the present invention to the particular embodiments described. On the contrary, the intention is to cover all modifications, equivalents, and alternatives falling within the spirit and scope of the present invention.

DETAILED DESCRIPTION

One of the key fraud problems involves the theft of account information from a credit card or other cashless payment mechanism. There are several ways to steal or skim account numbers from existing systems:

Internal Skimming Devices—Attachment of a device internally in the vending equipment can electrically collect account numbers from the transaction data stream. The account numbers can be wirelessly transmitted from the internal skimming device or the device can be retrieved for later collection of the data.

External Data Skimming—Attachment of a device to electrically collect account numbers from the data stream exiting the cashless payment device going to the payment processor.

Detection of emitted RF Energy—Legitimate device equipment can emit signals that external receivers can theoretically detect and decode to access the account number information due to the RF energy emitted as the account number data travels internally through the equipment.

False Front—Attachment of a skimming device, such as a false front, over a legitimate card reader can allow the capture data from a magnetic-stripe card as it is entering the legitimate card reader. An external skimming device that does not interfere with the legitimate reader may be able to capture stolen data while still allowing the legitimate transaction to occur.

Internal Skimming Devices

FIG. 1 shows various locations where an internal skimming device can be connected to collect account numbers from the data stream within an electronic payment system 10.

Account numbers can be captured by electrically connecting a skimming device to the data wires 12 between a card reader 14 and the vending machine controller 20. The skimming device can then either store the captured account numbers, or transmit the account numbers to a nearby receiver. This is especially easy to accomplish when the card reader 14 is mounted on a machine panel and communicates with the controller 20 via a data cable. For example, a vending machine that has a magnetic stripe or contact-less card reader 14 mounted on a panel and it has a short cable connecting the reader to a computer or other controller 20 housed in the machine is susceptible to skimming in this manner. A common RS-232 card reader that attaches to a computer with serial RS-232 communication software can transmit account information as printable characters that are easily copied, saved, or retransmitted to an unintended third party.

If a cashless payment system requires the entry of PIN numbers, this skimming scheme is often accompanied either with the placement of a camera for capturing the PIN number as it is entered. In a more sophisticated system, a device can be internally attached within the PIN pad 22 for capturing and storing or transmitting the PIN numbers for each card used.

Encrypting the account information can limit the success of internal skimming. Currently there are solutions available that can encrypt the account numbers within an encryption engine at or near the card reader read head. MagTek Inc., of Seal Beach, Calif., and others, for example provide a card reader with the encryption engine encapsulated within the read head.

These solutions also present barriers to their application in electronic cashless payment systems. Various current proposed solutions present undesirable situations as follows:

1. The entire card image is encrypted such that the local controller 20 cannot get access to portions of the data that do not need to be secure. The local controller 20, which may include a network access device, requires access to the following information:

Expiration date. So that the controller 20 can reject expired cards without having to submit the card to a transaction processor 30 resulting in an authorization fee charged to the merchant. The expiration date does not need to be encrypted in order to comply with current standards.

BIN number. The BIN number is the first six digits of an account number. The controller 20 needs to have access to the BIN number so that it can determine if the card is of a type that can be accepted. (e.g., VISA, MASTERCARD, DISCOVER, etc.) Without this information the controller 20 cannot locally reject card types that cannot be accepted thus unnecessarily incur an authorization fee charge.

Service Code. The Service code provides information about whether the account number can be used outside the country of origin and also information about whether this account requires a PIN code entry. Again having this information locally can save the expense of incurring an authorization charge.

2. Existing solutions allow portions of the data to be left completely clear so that the local controller 20 can have access to those fields use their own encryption scheme. However, these encryption solutions use an encryption scheme that requires special software at the transaction host 30 or they require an intermediary server to decrypt the transaction and re-encrypt it using the encryption scheme utilized by the final transaction server. This exposure at the intermediate server is a point of vulnerability.

3. Those solutions that allow portions of the data to be left completely clear for the local controller 20 can still be providing information that is best kept secret such as the card BIN number (first 6 digits) and the expiration date. It is less secure to have that data completely exposed.

External Data Stream Skimming

It has been possible in some systems to collect account numbers from the data stream 28 leaving the cashless payment device 10 going to the payment processor 30 through public networks such as Ethernet or telephone service. While this is rare at this time, it can be achieved by connecting a cable that routes data to these public networks.

External Detection of RF Energy

In some unattended cashless payment situations the card reader or mobile NFC mechanism is located some distance from the cashless payment device 10. It is possible that the data cable 12 connecting the card reader 14 to the controller 20 can emit RF energy that can be detected and decoded by a device with a nearby antenna.

False Front Skimming

Account numbers can be skimmed by placing a false front over the magnetic stripe card reader 14 of a machine. This can be done without gaining access to the inside of the equipment. A false front reads the magnetic card before the customer's card enters the proper card reading mechanism 14. This false front has either an electronic storage device or a transmitter so that the account numbers can be captured. This scheme is often accompanied with a camera for capturing the account numbers or a PIN.

A number of schemes for detecting a false front have been proposed. One scheme uses infrared light paths that can detect when material has been added to the front of the reader 10. Another scheme uses a metal sensor to detect additional electronics has been added to the front of the device 10. If a false front is detected the ATM machine would be shut down causing the display to go blank, hopefully discouraging a user from attempting to use the card reader 14. The following patents that describe previous attempts to implement false front detecting systems: U.S. Pat. No. 7,602,909 to Shields, U.S. Pat. No. 6,422,475 to May, and U.S. Pat. No. 6,367,695 to Mair. These systems are not without limitations.

"Trojan Horse" Attacks

Trojan Horse attacks generally refer to attacks on account numbers. There are two types of "Trojan Horse" attacks: Trojan Horse Hardware involves swapping out the card reader equipment 14 with what appears to be identical card reading equipment and Trojan Horse Software, where the software 32 within the controller 20 is replaced or modified so that an additional function of storing or transmitting account numbers is added.

In a hardware attack, the actual card reader 14 used in a vending machine is replaced with an identical-looking device ("Trojan Horse") that captures card numbers. The replacement does not necessarily have to function properly. When this replacement has occurred a user will present a credit card for payment to the replacement device. Even if the vending machine does not operate the account number will have been captured. It could be possible for dozens or hundreds of card numbers to be captured before the fraudulent replacement is detected. The Trojan Horse device may be swapped back with the original device 14 before authorized service personnel get called out to inspect the machine.

Existing solutions generally consist of being careful that the equipment is secured with mechanical locks where only trusted and authorized personnel have access to the components within the equipment. This is not always very secure however, as people can pose as service personnel to request or duplicate the required keys, and gain access. Mechanical locks are also susceptible to being compromised by picking the lock.

When a cashless payment system uses a PC computer running a common operating system such as Microsoft Windows, it is possible for a person to replace components of the operating software or system software 32 with "Trojan Horse" software that can capture account numbers from the data coming from the equipment card reader 14. This Trojan Horse software can capture account numbers even when the data from the card reader is encrypted as the operating system or software 32 often must decrypt the data in order to do its processing before sending the information on to the processing host. Electronic cashless payment systems 10 that use computer systems running public operating systems such as Microsoft Windows are especially vulnerable to software attacks such as a software Trojan Horse.

These are similar to the types of virus, worms, malware, and Trojan Horses that plague the software industry. Such public attacks often occur while connected to the Internet. Though an electronic cashless payment system is not typically browsing the Internet, it is still connected to a public network and could experience a similar attack. Furthermore, such systems often have some sort of input device, such as a USB port, a CD-ROM/DVD reader, or a removable disk drive, for loading software updates. Such a device can be used for injecting malicious software that can be used to skim account numbers.

Use of Fraudulent Account Numbers

Once a person has obtained a stolen payment media, or created one using skimmed account numbers financial fraud is difficult to stop. A stolen or skimmed account number can be easily used at an unattended electronic cashless payment system since there are no personnel available to check for identification or to verify a signature to ensure that the person holding the card or payment media is the account holder. This type of fraud represents a significant loss to merchants and illustrates the need a secure solution.

When an account number has been stolen, the immediate use of that account can cause severe problems and financial loss. With the utilization of embodiments of invention as disclosed herein, the opportunity to utilize stolen account numbers at the unattended cashless payment system is reduced and thus a reduction in fraud can be accomplished. An embodiment of a secure payment system can present the entire card track image to a transaction processor, qualifying the transaction for card present transaction rates. The addition of a keypad and an interface to present instructions, requesting the customer to enter a zip code or similar customer identifying details, the transactions can qualify for a lower transaction rate.

Secure Payment System

Various embodiments of the present invention address attacks on card readers and vending devices, and work to prevent the proliferation and illegal use of stolen account numbers. Embodiments of an exemplary encryption security mechanism included in magnetic card readers or NFC readers can reduce the likelihood of successful attacks on payment processors and payment networks.

Figure 2:
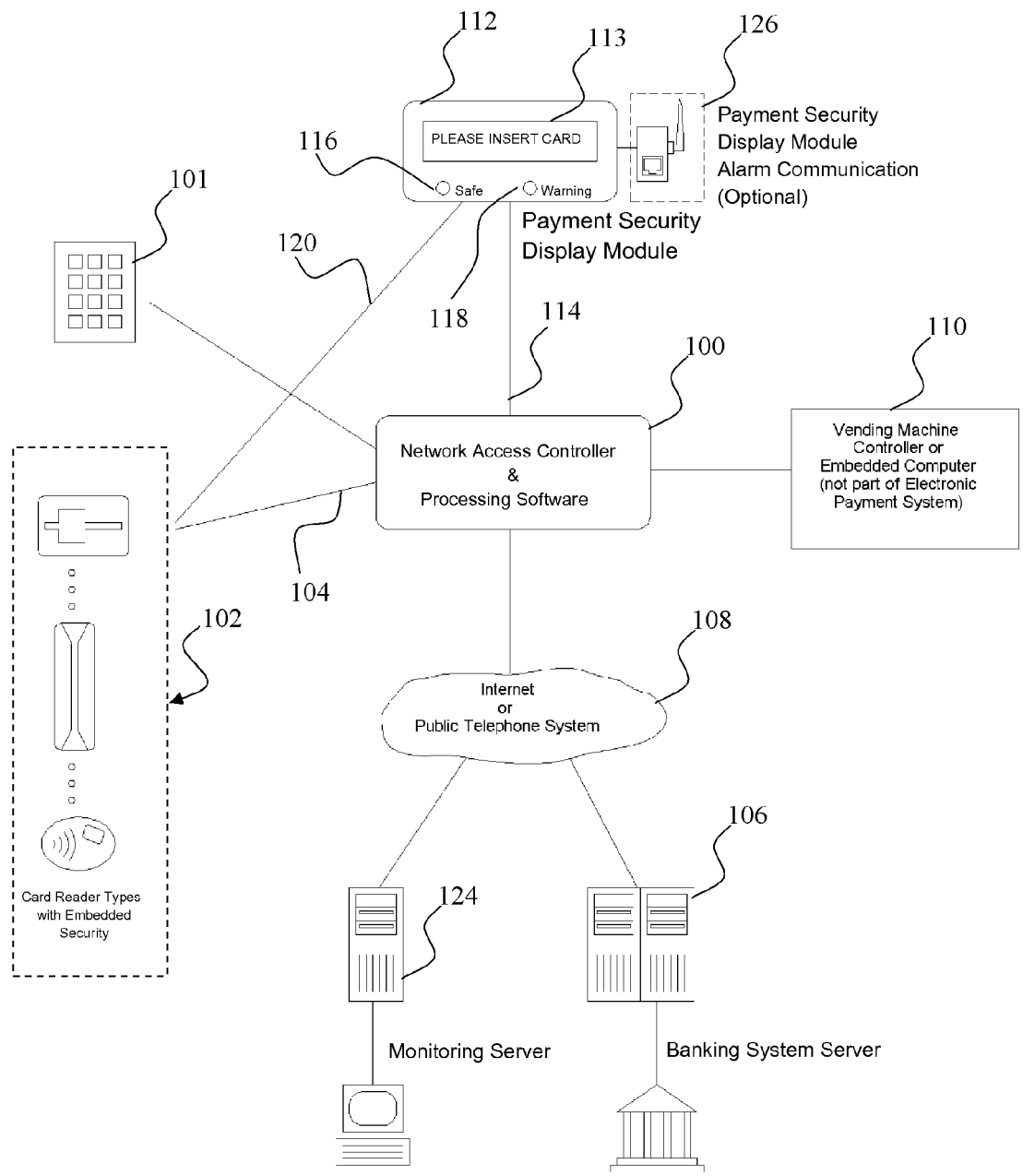
FIG. 2 is a block diagram of an exemplary secure electronic payment network according to an embodiment of the present invention.

FIG. 2 depicts an example secure payment system and financial transaction network. The network access controller 100 manages communication between the vending machine controller 110, a customer payment input device 102, and a payment transaction processor 106. The network access controller 100 can be enabled to accept cashless payment by the vending machine controller 110. A vending machine controller 110 can inform the network access controller 100 of the payment amount when a user selects an offered product for purchase.

Network Access Controller

The network access controller 100 can receive payment information from the customer payment input device 102. The network access controller 100 can determine if a presented payment input is valid by checking account type and expiration date or send an appropriate message about the payment status (e.g., expired card, invalid card type, etc.) to the payment security display module 113. If the payment input is valid, the Network access controller 100 creates a protocol communication packet appropriate for the particular banking system transaction-processor or server 106.

The network access controller 100 can contain a CPU or micro-controller, volatile memory, non-volatile computer readable storage, and several interfaces to other components. Network access controller 100 can configured to receive and decrypt preliminary data from the secure payment input device 102 such as a magnetic stripe card reader, a contactless reader, or both. This data can be received via connection 104.

The connection between the Network access controller 100 and the vending machine controller 110, or other embedded computer, can allow a communication channel to be established with the transaction processor 106 for maintenance, logging, or reporting functionality. The transaction processor 106 can send control messages to the vending equipment controller 110 via the connection between the network access controller 100 and the vending machine controller 110.

The network access controller 100 can communicate with the payment security display module 112 to send display messages (e.g., "Please insert card", Expired card", etc.). The Network access controller 100 can also communicate with the payment security display module 112 to detect tampering and to cause the "Safe" light 116 or "Warning" light 118 to be illuminated.

Payment Security Display Module

Figure 3:
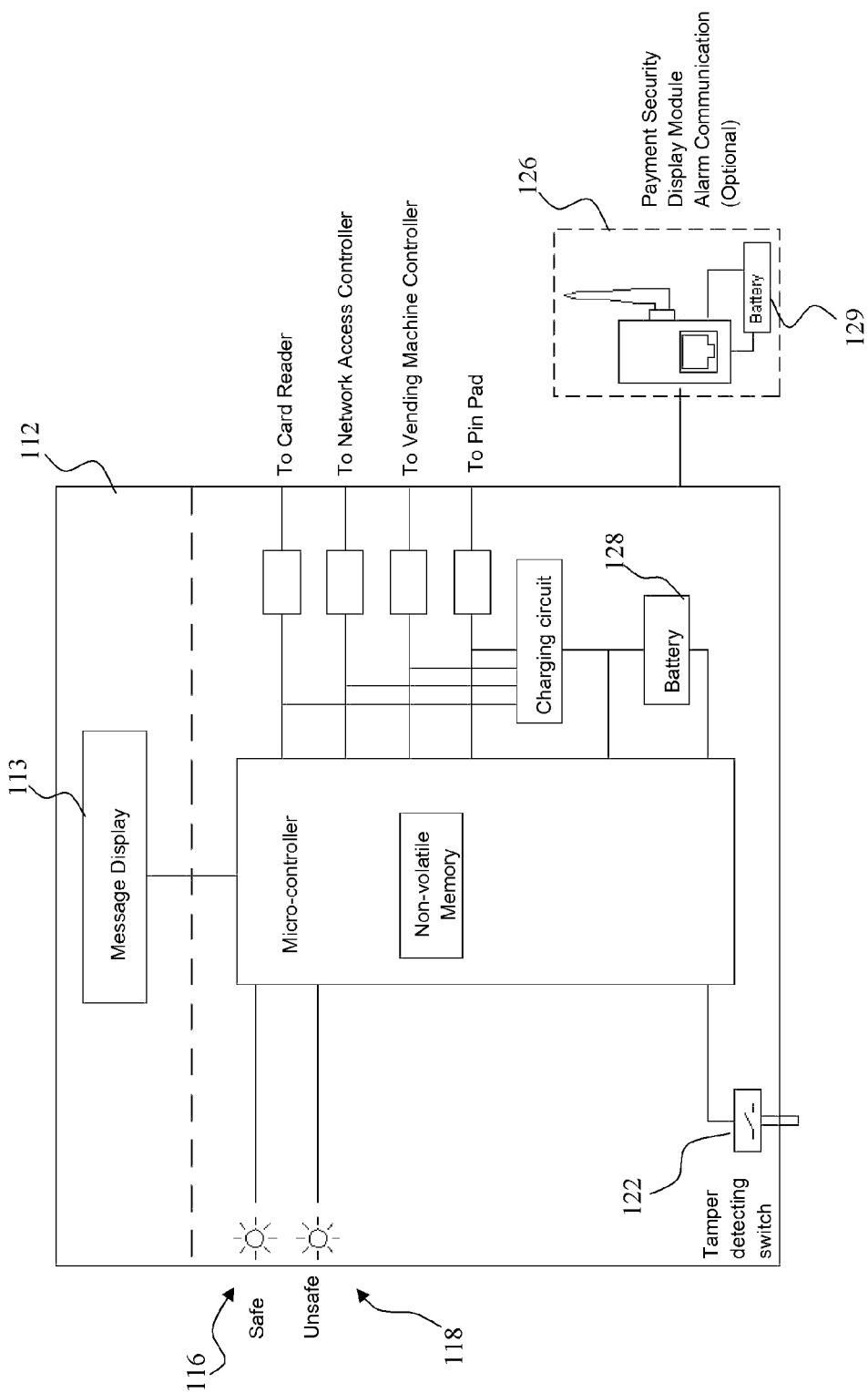
FIG. 3 is a block diagram of an exemplary payment security display module according to an embodiment of the present invention.

Referring to FIG. 3, an exemplary payment security display-module 112 can include a relatively small display 113 placed on the exterior of the vending machine in a location visible to the user. The payment security display-module 112 can monitor the security of the electronic cashless payment system and display the status of the security via a lighted "Safe" indicator 116 or "Warning" indicator 118. The payment security display module 112 can also display other useful messages to the customer about the state of the payment system. These messages can be status messages as "Please insert card", "Expired card", "Machine out of Order", etc.

An exemplary payment security display module 112 can monitor the following conditions within the system:

- It can detect that the connection 120 to the secure card reader 102 has been disturbed. As an example this could be either an electrical continuity detection circuit that detects the cable has been disconnected or it can be a mechanism for detecting that the connection 104 between the card reader 102 and the network access controller 100 has been disturbed.
- It can detect that its connection 114 to the network access controller 100 has been disturbed.
- It can detect that the serial number in the card reader 102 has changed from when it was last configured.
- It can detect though a tamper detecting switch 122 that it has been moved.

The payment security display module 112 can provide indications including:

- A display indicator to present payment acceptance messages such as "Insert Card", "Expired card", "Card declined", etc.
- A display indicator to present the Electronic Cashless Payment System security status. It can show, for example, either the "Safe" or the "Warning" light.

The Payment Security Display Module 112 can communicate an alarm to the Remote Monitoring Server 124, through at least one of the following mechanisms:

- The wired-connection to the Network access controller 100 the provides a communication link to the server 124.
- A wireless, or other public network connection, to the Monitoring Server via a separate communication module 126.

The monitoring server 124 can be configured to receive alarm messages from the network access controller 100 or payment security display module 112. It can then relay this message to service personnel via email or cell phone text message. This monitoring server 124 can also provide an interface to configure and enable alarm features, additional security configurations, and special instructions to the unattended payment.

Security Features

Interruption of Connection Tampering Detection

Referring to FIG. 2, if any of the interconnecting data cables (104, 114, 120) are briefly disconnected, any one, or all, of the following can occur in response:

- The "Warning" light 118 or the display 113 on the payment security display module 112 can indicate an unsafe alert to the unsuspecting cashless payment user. A payment security display module 112 can include a rechargeable battery 128 that can keep the "Warning" system working for an extended period. In one embodiment a two-day warning indication can be provided. The warning indication or message can therefore be displayed even if the vend system has lost power.
- If the firmware in the network access controller 100 detects that a connection 104 has been broken, or if the payment security display module 112 detects a broken connection 104 between to the card reader 102 the Network access controller 100 can attempt to send a warning message to the payment security display module via link 114.
- If the firmware in the Network access controller 100 has detected that the serial number in the payment security display module 112, or the serial number in the card reader 102 is not what was configured, it can attempt to send a warning message to the payment security display module 112.
- If the firmware in the network access controller 100 has detected a broken connection 114 due to the fact that it cannot communicate with the payment security display module 112, or has detected a serial number change in either the module 112 or the card reader 102, it can attempt to send an alarm message to the monitoring server 124.
- The payment security display module 112 can be configured with an remote communications module 126. This module 126, when tampering is detected, can send an alarm message to the remote monitoring server 124, or any other server, via its own connection to the wireless cell phone network, the internet 108, or any other network. This module 126 can include a rechargeable battery so that it can send the message even if power is disconnected.

The security system shown in FIG. 2 can include a monitored connection 103 to the optional PIN pad 101 so that tampering with the PIN pad 101 can be detected and reported by the payment security display module 112. When the payment security display-module 112 goes into warning mode, and when the system is first configured for operation, a service person can use the payment-monitoring server 124 to configure the payment security module 112 for normal operation.

Detection of Serial Number Change Tampering

The preliminary data coming from the read head assembly 102 to the network access controller 100 can be encrypted with the card reader serial number. If the network access controller 100 detects that the serial number of the secure card reader 102 has changed, it can generate an alarm (tell the security module to show "Warning" indication 118 or other message). The network access controller 100 can stop accepting payments, send an alarm to the monitoring host, and it can also notify the vending machine controller 110, if configured, of the situation.

If the network access controller 100 detects that the serial number of the secure payment display module 112 has changed it will send an alarm to the monitoring host, it will stop accepting payments and it will also notify the vending machine controller 110, if capable, of the situation.

End-to-End Encryption

Figure 4:
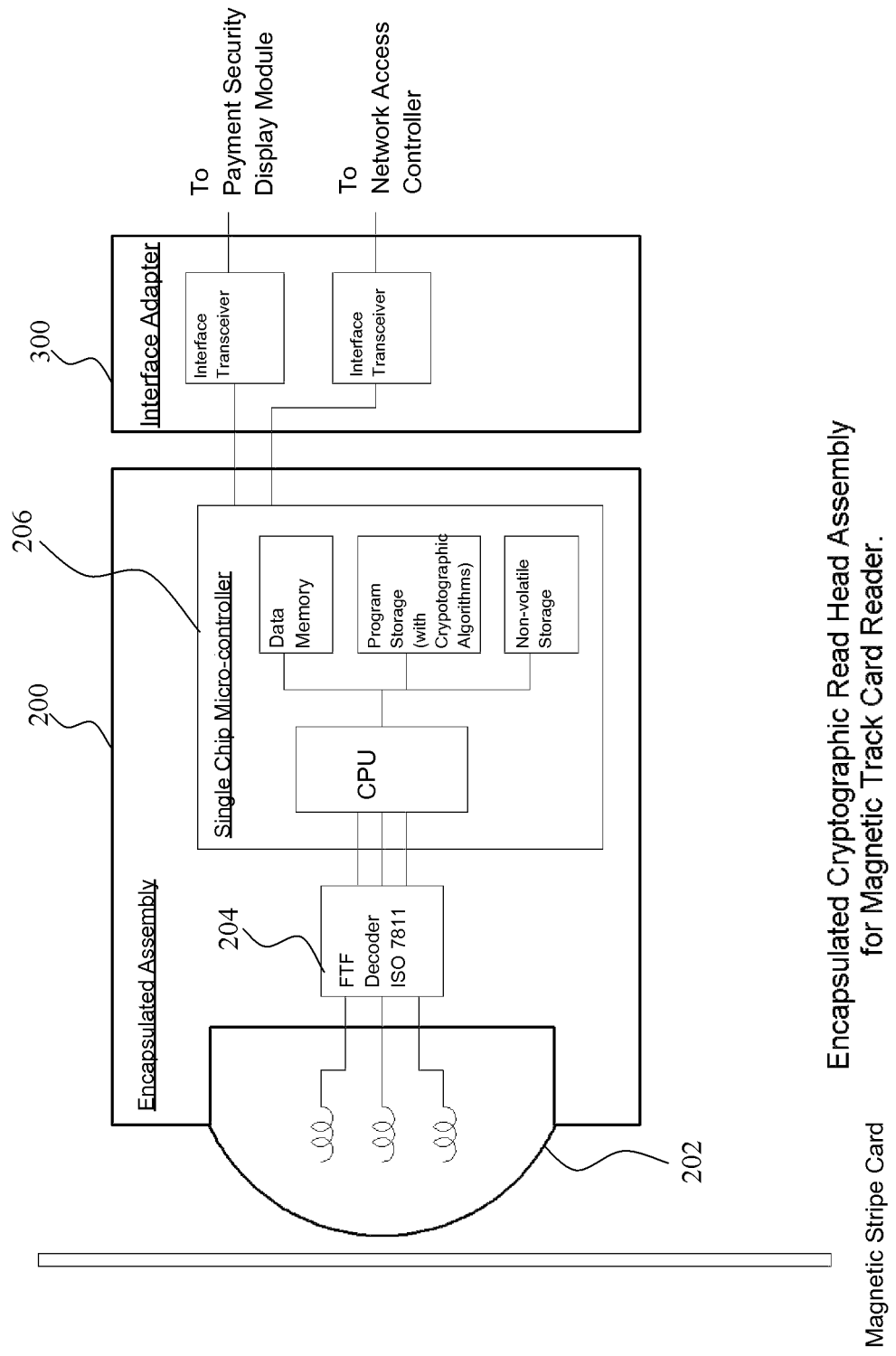
FIG. 4 is a block diagram of an exemplary magnetic read head assembly according to an embodiment of the present invention.
Figure 5:
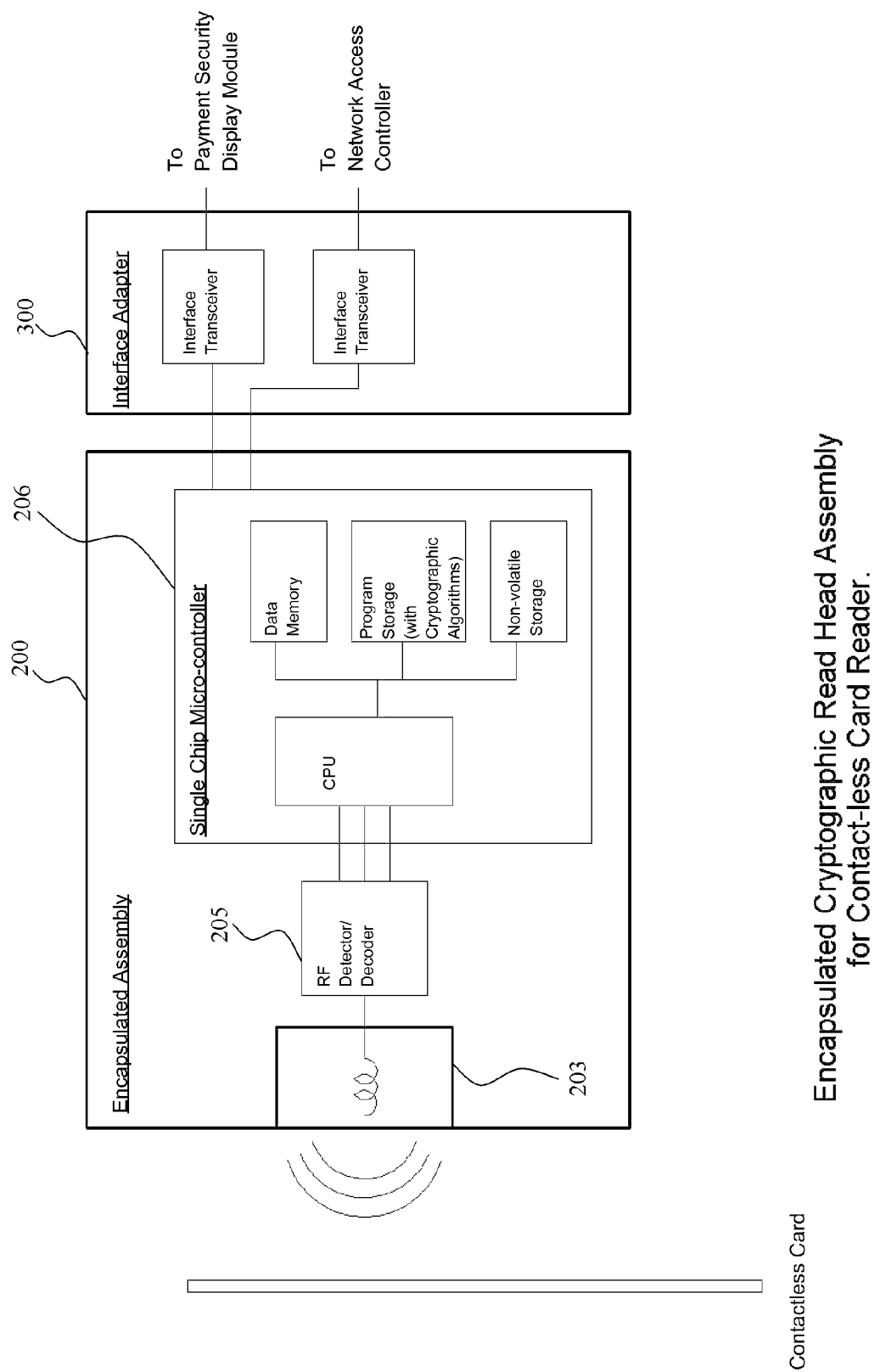
FIG. 5 is a block diagram of an exemplary contact-less read head assembly according to an embodiment of the present invention.
Figure 8:
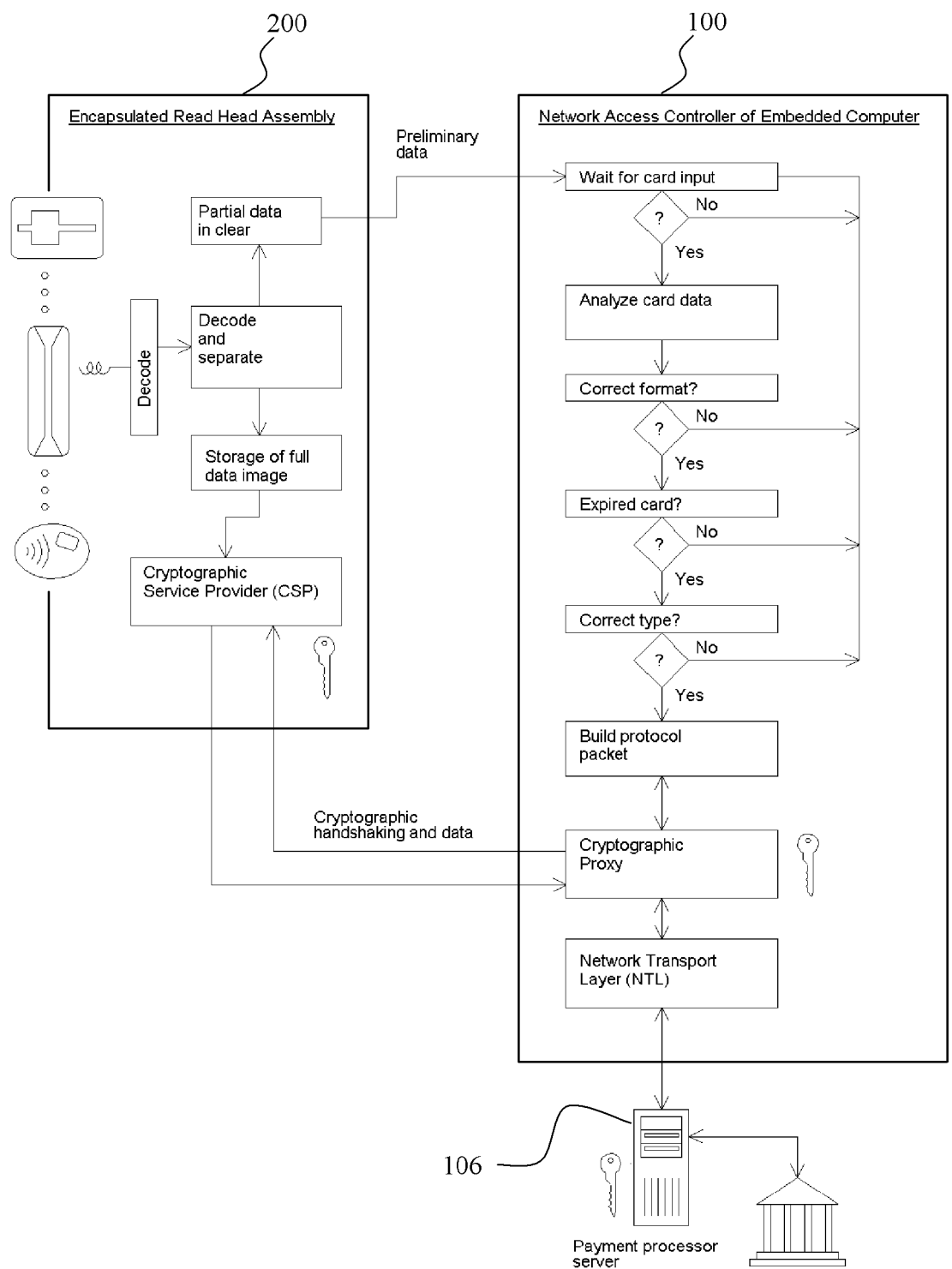
FIG. 8 is a diagram of an exemplary electronic cashless payment system with an encapsulated encrypting read head.

As depicted in FIGS. 4-5 and 8, a secure card reader 200 with a secure encapsulated encrypting read head 202 can be a magnetic stripe card reader, a contact-less card reader, a mobile phone NFC reader or any combination. A secure card reader 200 can have a built-in Cryptographic Service Provider (CSP). Card reader 200 can negotiate authentication and encryption directly with a transaction host (through a secure pass-through in the Network access controller 100, using the Network access controller Network transport Layer (NTL)) and then send the transaction through the Network access controller directly to the Transaction processor.

The flow chart depicted in FIG. 8 shows an embodiment where only preliminary data is presented to the network access controller 100 as the first step in the process initiated by the secure card reader 200. Network access controller 100 can construct a communication packet for the appropriate, configured transaction processor 106, request that the secure card reader 200 encrypt a communication packet for the transaction processor 106. Network access controller 100 can receive the reader-encrypted packet and pass it on directly to the transaction processor 106, thereby maintaining the secrecy of the account data between the reader 200 and the transaction processor 106.

One example of this transaction is depicted in FIG. 8 where the Cryptographic Proxy can send the protocol packet to the Cryptographic Service Provider (CSP) in the card reader 200. The Read Head assembly and then the Cryptographic Proxy receives the encrypted response and passes it directly to the transaction processor through the Network Transport Layer (NTL).

The Network access controller 100 sends the communication packet to the secure card reader and asks it to negotiate authentication and encryption with the banking system transaction processor. When the Network access controller 100 has been information by the banking system transaction processor that the payment is finalized it notifies the Vending Machine Controller 110 that it is OK to vend the product.

If at any time the electrical connection 114 between the payment security display module (PSDM) 112 and the secure card reader or the network access controller 100 is broken the PSDM 112 will enter warning mode and will display a "warning" message and will attempt to send an alarm message to the monitoring server through the network access controller 100.

If at any time the data communication between the PSDM 112 and the secure card reader 200 or the network access controller 100 is broken the PSDM 112 will enter warning mode and will display a "warning" message and will attempt to send an alarm message to the monitoring server through the network access controller 100. If the PSDM 112 has entered warning mode and cannot communicate with the network access controller 100 to send out an alarm message, and if the PSDM 112 includes a communication device 126 it will attempt to send out the alarm through the communication device 126.

The PSDM 112 can have a backup battery 128 that has its charge maintained while connected normally to the network access controller 100 so that if the connection is electrically broken or if the vending machine has had its power removed the PSDM 112 can still illuminate the warning indication 118 for a period of time. The optional PSDM communication device 126 also can include a backup battery 129 that has its charge maintained while the PSDM 112 connected normally to the network access controller 100 so that if the connection is electrically broken or if the vending machine has had its power removed the PSDM communication device 126 can still function long enough to send out the alarm message.

Referring to FIGS. 4 and 5, the card image data, from magnetic stripe, contact-less cards, and NFC mobile phones, can be encrypted within an encapsulated read head (202, 203). The electronics, including the signal detector 204, a micro-controller 206, program storage memory, data memory, and non-volatile memory are encapsulated within the read head module 200 with epoxy or other tamper resistant material.

Other solutions that encapsulate such devices with in the magnetic stripe read head are available from card reader supplies such as MagTek Inc., of Seal Beach, Calif. However, the current solutions have specific encryption algorithms that either require the local network access controller to open the encryption and then re-encrypt it using the encryption supported by the transaction server or they require first sending the card image to an intermediate server which then decrypts the information before passing it on to the final processing server.

An embodiment of the invention includes an encryption engine built-in to the read head that negotiates the encryption directly with the final processing server using a commonly implemented and understood client/server authentication and encryption negotiation scheme known as Secure Socket Layer version 3 (SSLv3) (1995) and Transport Layer Security (TLS) (Internet Engineering Task Force (IETF) 1997-1999).

A block diagram of the components embedded within the magnetic read head 202 are shown in FIG. 4. A block diagram of the components embedded within the contact-less read head 203 are shown in FIG. 5. Embodiments of secure card reader 200 can include one or both types of read head devices. Along with the detector circuit (204, 205), a single chip micro-controller 206 can be embedded within the reader 200. This micro-controller 206 can be programmed to decode the data stream from a payment card presented to the read head (202, 203). The micro-controller 206 can include Cryptographic Service Provider (CSP) functions, and be configured to negotiate SSL/TLS handshaking directly with a secure server 106 over a network 108. The micro-controller 206 can also include non-volatile computer readable storage for storing the SSL Certificates of Authority that can be used in the SSL/TLS negotiation.

Figure 6:
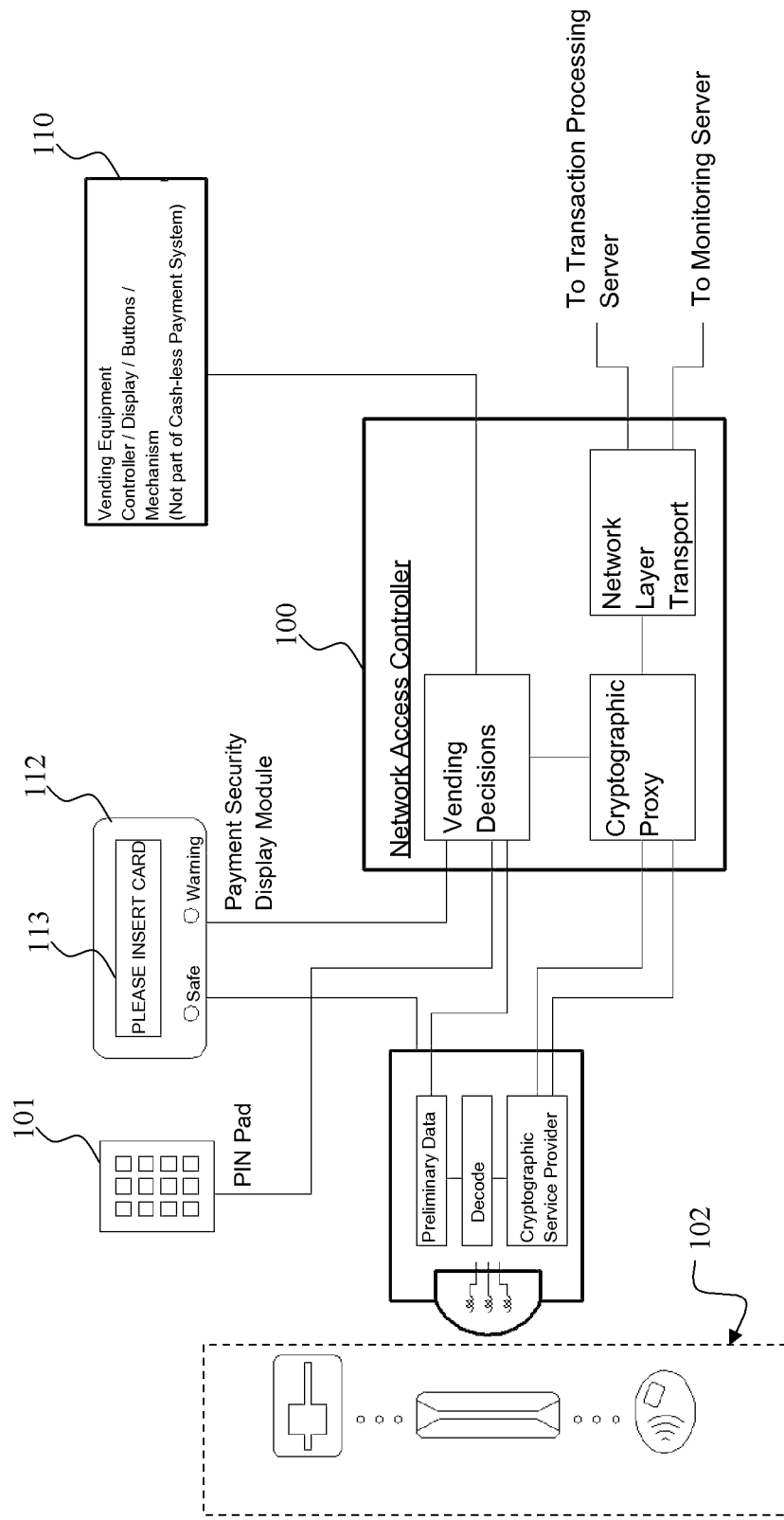
FIG. 6 is a block diagram of an exemplary secure electronic payment system assembly according to an embodiment of the present invention.

Referring to FIG. 6, a block diagram of an embodiment of a secure electronic payment system assembly is depicted, according to an embodiment of the present invention.

Figure 6A:
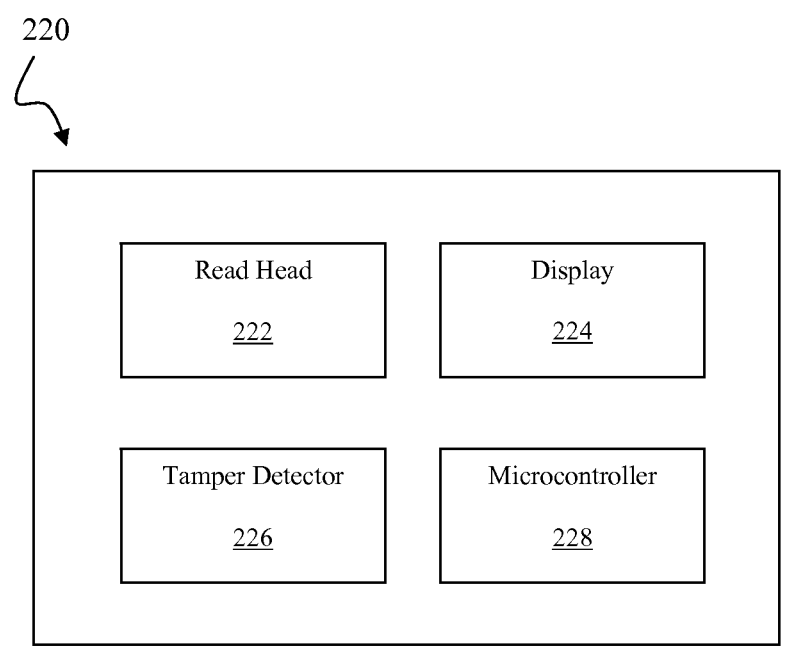
FIG. 6A is a block diagram of a secure reader according to an embodiment of the present invention.

In an embodiment, referring to FIG. 6A, a block diagram of a secure reader 220 is depicted, according to an embodiment of the present invention. In an embodiment, secure reader 220 generally comprises read head 222, display 224, tamper detector 226, and microcontroller 228. In embodiments, read head 222 can comprise a read head substantially similar to read heads described herein. In embodiments, display 224 can comprise a display substantially similar to displays described herein, such as a PSDM. In embodiments, tamper detector 226 can comprise a tamper detector substantially similar to tamper detectors described herein. In embodiments, microcontroller 228 can comprise a microcontroller substantially similar to microcontrollers described herein.

Figure 7:
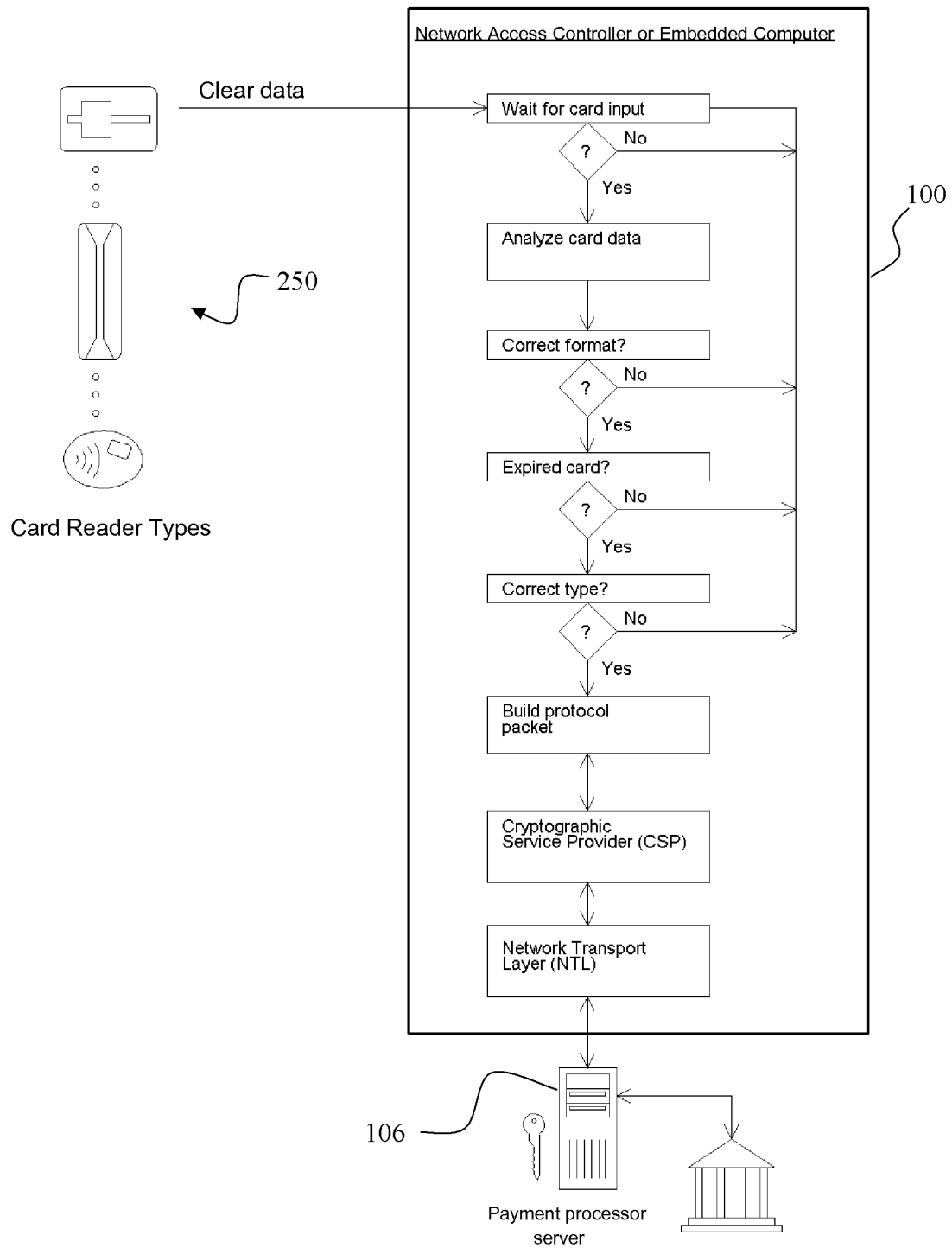
FIG. 7 is a diagram of an exemplary electronic cashless payment system with a non-encapsulated read head.

FIG. 7 shows how SSL/TLS can be implemented in an existing electronic cashless payment system. An existing card reader 250 that does not encrypt data, or transmits in the clear, between the card reading mechanism 250 and a network access controller 100. The network access controller 100 can analyze the card data, determine if a correct card format has been presented to the reading mechanism 250, determine if the card has expired, determine the card type, build a protocol packet, encrypt the account data with a CSP, and finally transport the encrypted packet to a payment processor or server 106.

FIG. 8 shows an example embodiment of a secure electronic cashless payment system. In FIG. 8, the Cryptographic Service Provider of FIG. 7 has been replaced with a Cryptographic Proxy and the Cryptographic Service Provider is encapsulated in the Secure Encapsulated Read Head Assembly 200.

In FIG. 8 it is seen that when a user presents payment, the secure encapsulated read head assembly 200 first presents preliminary data to the network access controller 100 so that decisions can be made about expiration date, card type, and whether the reader 200 is secure (from the checksum and serial number included). This preliminary data includes portions of the data that are required to make the described decisions along with the secure reader serial number and operating firmware checksum. When the network access controller 100 has determined that the payment is acceptable, it forms the appropriate transaction packet and sends it to the Cryptographic Service Provider in the secure read head assembly 200 for encryption.

The encapsulated secure read head assembly 200 can have a connection to the network access controller 100. This first provides the read head assembly 200 with the capacity to send encrypted preliminary data for the network access controller 100 to use to make decisions based on card type, expiration date, etc. Also, this preliminary data includes the read head serial number and firmware checksum to be used to verify security. Second, when the network access controller 100 has verified that the payment can be accepted, the controller will format the appropriate transaction package for the transaction processor and send that package to the secure read head assembly 200 to request that it be sent to the transaction processing server 106. The read head assembly 200 will negotiate authentication with the transaction processor server 106 and send the complete package.

The encapsulated secure read head assembly 200 can also include a connection to a payment security display-module 112. The payment security display-module 112 uses this connection to monitor a card reader disconnect event and to monitor the card reader serial number.

Remote Security Server

Referring again to FIG. 2, the remote monitoring server 124, is a secure server. An electronic cashless payment system can communicate with it using SSL/TLS negotiated directly from the network access controller 100. The remote monitoring server 124 can include the following functions:

Receive alarm messages from the network access controller 100.

If the payment security display module 112 is configured with its own communication channel it can receive alarm messages from the module.

Receive periodic check-in reports from configured network access controllers 100 and/or Payment Security Display modules 112.

For additional security, the remote monitoring server 124 can be configured to periodically call out to certain configured Network Access Controllers 100 and/or Payment Security Display Modules 112 to verify operating status.

The remote monitoring server 124 can also used by support personnel to access the payment system to configure it and arm or reset the monitoring features.

The remote monitoring server 124 can receive sales reports from the each Network Access Controller 100. These sales reports can be saved as files, sent out as emails, or posted to a website. These reports do not have full account numbers (just last five digits and card type with other information such as sale date, time, and amount).

Preliminary Data Received from Secure Card Reader

When a payment from a magnetic stripe card, contact-less card, or NFC mobile phone is presented at the secure reader, it will first send preliminary data to the Network Access controller.

This preliminary data has portions of the data masked off as shown in FIG. 9. The remaining portions of the data can be used to determine card type, expired cards, cards requiring PIN codes, etc.

The preliminary data includes the card reader serial number and an MD5-128 checksum of the operating software. Since the preliminary data includes the secure reader serial number and operating software checksum, the preliminary data is encrypted. This encryption keeps the serial number, checksum, and the unmasked data secret. Any one of a number of encryption schemes can be used. Even if this encryption is broken, the account number data is secure since it was masked off.

FIG. 9 shows the format of the preliminary data. This data is actually encrypted between the secure card reader and the Network Access Controller.

Figure 10:
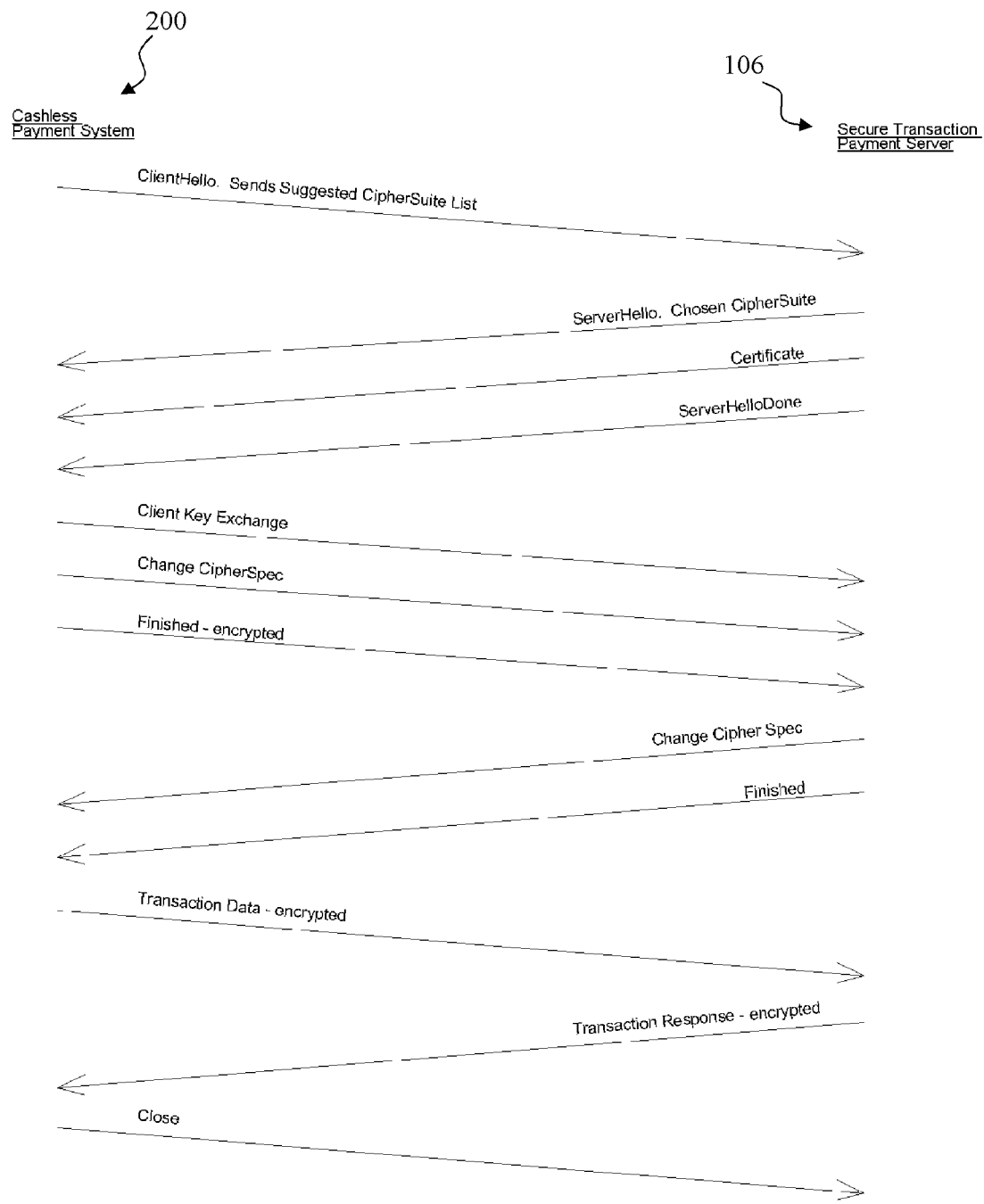
FIG. 10 depicts a communication handshaking sequence between a cashless payment system and a secure payment server.

An example of a client server authentication and encryption negotiation is shown in FIG. 10. By using SSL/TLS the electronic payment system is secure and can connect with and transmit electronic payment information to any payment process able to securely process credit card payments from Internet web browsers. There is no need for an intermediate server.

This is true end-to-end encryption since the account data is encrypted within the encapsulated module that first received the account information. It remains encrypted all the way to the transactions processing host without having to be opened by the local controller, or an intermediary server. Since the transaction is never decrypted, this system is immune to software attacks such as viruses, worms, Trojan Horse, malware, etc.

False Front Prevention to Defeat External Skimming

An Electronic Cashless Payment System that accepts magnetic stripe cards can be configured to utilize a variety of magnetic strip card readers, including insertion readers and swipe readers.

Insertion Readers are vulnerable to the false front attack. For Example, an identical faceplate with a read head and storage and/or a transmitter can be put over the front of the reader. The read head in the false front captures the account number before the card gets into the proper reader.

Figure 11:
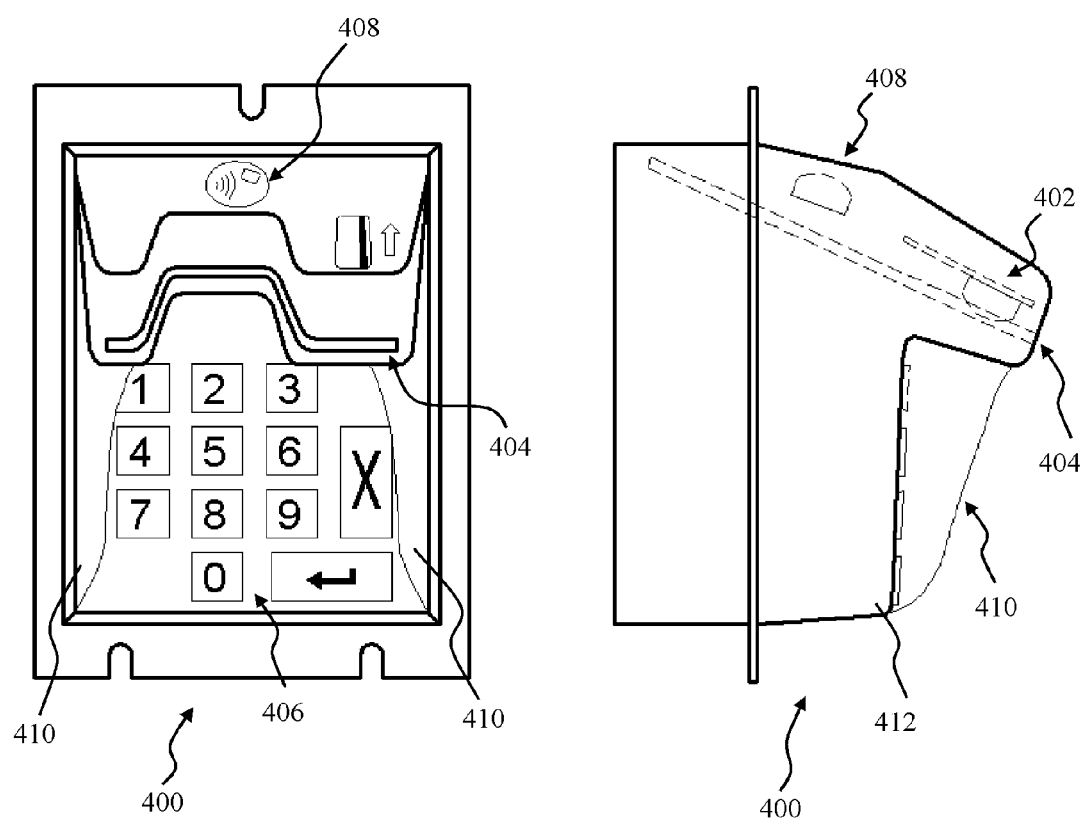
FIG. 11 depicts an exemplary embodiment of a false-front resistant insertion card reader.

Referring to FIG. 11, an exemplary embodiment of a false front resistant insertion reader 400 can include a read head 402 on top of the card slot 404. The card track slopes down to help prevent water from entering or damaging the reader 400. The downward slope of the card slot 404 and its location directly over the keypad 406, any sort of false front will be difficult to attach and will be obvious since it will obscure part of the keypad 406. The insertion reader 400 can be sized to fit in the same cutout used in vending machines for a common bill acceptor, making it possible to remove a bill acceptor and replace it with an embodiment of a cashless payment system insertion reader 400.

The insertion reader 400 can include an encrypting magnetic stripe read head 402 and the Network Access Controller features embedded within the Insertion Reader enclosure 412. In one embodiment, the insertion reader 400 can also include an encrypting contact-less card or mobile NFC read module 408. Insertion reader 400 can have soft material privacy shield 410 along the sides of the key pad to obstruct viewing of the key pad 406 with intention of harvesting PIN numbers.

In another embodiment the key pad 406 of the Insertion Reader 400 can include a touch screen LCD display such that it could display vending machine item selection or welcome messages in addition to providing a numeric keypad. The touch screen clear plastic panel could have physical ridges in the plastic around the area where each on the PIN pad numbers can be displayed to assist in locating the button areas.

Swipe readers are also vulnerable to the attachment of a small additional swipe reader to one end or the other of the swipe track. The read head in the additional swipe reader captures the account number as the card passes through it.

Figure 12B:
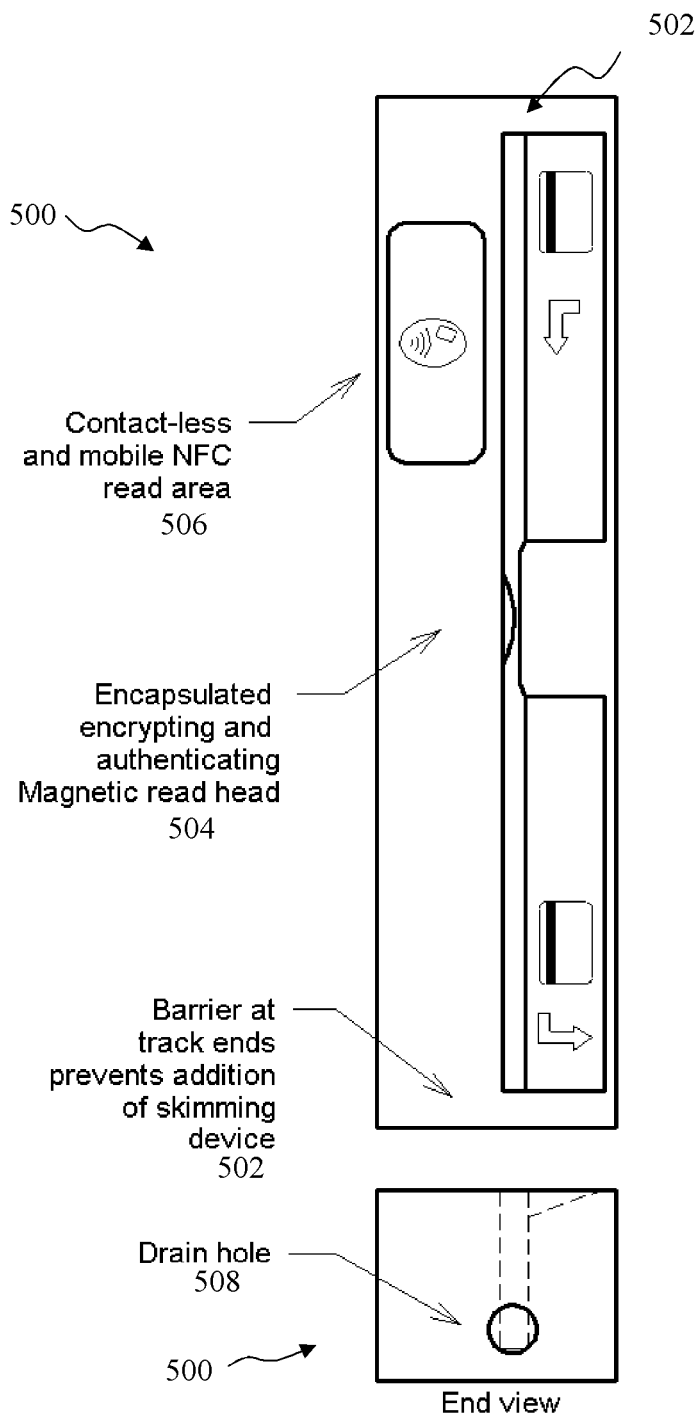

Referring to FIGS. 12A and 12B a false front resistant swipe reader 500 includes blockages 502 at both ends so that it is impossible to add a skimming swipe reader to either end. The Swipe Reader 500 can include the encrypting magnetic stripe read head 504. In one embodiment, the Swipe Reader 500 can also include the encrypting contact-less card and mobile NFC read module 506. At the bottom of the swipe reader 500 the blockage 502 can include a drain hole 508 to allow any water or other fluid to escape.

The foregoing descriptions present numerous specific details that provide a thorough understanding of various embodiments of the invention. It will be apparent to one skilled in the art that various embodiments, having been disclosed herein, may be practiced without some or all of these specific details. In other instances, known components have not been described in detail in order to avoid unnecessarily obscuring the present invention. It is to be understood that even though numerous characteristics and advantages of various embodiments are set forth in the foregoing description, together with details of the structure and function of various embodiments, this disclosure is illustrative only. Other embodiments may be constructed that nevertheless employ the principles and spirit of the present invention. Accordingly, this application is intended to cover any adaptations or variations of the invention. It is manifestly intended that this invention be limited only by the following claims and equivalents thereof.

References to relative terms such as upper and lower, front and back, left and right, or the like, are intended for convenience of description and are not contemplated to limit the invention, or its components, to any specific orientation. All dimensions depicted in the figures may vary with a potential design and the intended use of a specific embodiment of this invention without departing from the scope thereof.

Each of the additional figures and methods disclosed herein may be used separately, or in conjunction with other features and methods, to provide improved devices, systems and methods for making and using the same. Therefore, combinations of features and methods disclosed herein may not be necessary to practice the invention in its broadest sense and are instead disclosed merely to particularly describe representative embodiments of the invention.

What is claimed is:

1. A secure reader for use with a cashless transaction system for an unattended vending machine having a network access controller coupled over a network to a financial transaction processing server, the secure reader comprising:
  a reading means configured to read data from a cashless transaction device, the data from the cashless transaction device including account information and at least one portion of non-account information;
  a display configured to present payment status information to a user;
  a tamper detector configured to detect tampering with the secure reader;
  a cryptographic service provider configured for encryption and decryption;
  a microcontroller securely coupled to the read head, the display, the tamper detector and the network access controller;
  memory storing executable instructions that, when executed by the microcontroller, causes the microcontroller to perform the steps of:
    presenting warning information to the user via the display in response to the tamper detector;
    transmitting the at least one portion of non-account information from the data from the cashless transaction device to the network access controller;
    receiving a protocol packet and encryption request from the network access controller, the protocol packet having a format unique to communications with the financial transaction processing server;
    negotiating a predetermined encryption key with the financial transaction processing server based on the encryption request; and
    conducting a financial transaction with the financial transaction processing server, wherein the conducting comprises:
      encrypting financial information with the cryptographic service provider in the protocol packet format using the predetermined encryption key, wherein the financial information includes the account information from the data from the cashless transaction device, and
      transmitting the encrypted financial information to the financial transaction processing server.

2. The secure reader of claim 1, wherein the network access controller comprises one or more network access controller serial numbers, and the secure reader further comprises one or more secure reader serial numbers, wherein the microcontroller is configured to authenticate a secure connection to the vending machine by comparing the one or more secure reader serial numbers and the one or more network access controller serial numbers of the vending machine and to present warning information to the user on the display in the event the secure connection to the vending machine is not authenticated.

3. The secure reader of claim 1 wherein the microcontroller is configured to encrypt the transaction information with the predetermined encryption key, wherein the predetermined encryption key is decodable by the network access controller of the vending machine prior to transmission of the transaction information to the network access controller of the vending machine.

4. The secure reader of claim 1 wherein the tamper detector is configured to detect tampering by one or more of: interruption of power, disconnection of the secure reader and the network access controller, and physical tampering of the secure reader.

5. The secure reader of claim 1 wherein the microcontroller is further configured to periodically engage in secure communications with a monitoring server to report status of the secure reader.

6. The secure reader of claim 5 wherein the secure communications with the monitoring server occur via the network access controller of the vending machine.

7. The secure reader of claim 5 further comprising a wireless communication link, and wherein the secure communications with the monitoring server occur via the wireless communication link.

8. The secure reader of claim 6 wherein the microcontroller is further configured to periodically engage in secure communications with the display and report a status of the display with the monitoring server.

9. The secure reader of claim 1 further comprising a keypad configured to accept identification information provided by the user, and wherein the keypad is securely coupled to the microcontroller and the microcontroller encrypts the identification information as part of the financial information for the financial transaction such that it is not decrypted by the network access controller of the vending machine.

10. The secure reader of claim 1 wherein the microcontroller is configured to receive encrypted authorization for the financial transaction from the financial processing server and initiate a secure communication with the vending machine to cause the vending machine to perform an authorized vending operation.

11. The secure reader of claim 1 wherein the microcontroller, the read head, the display, the tamper detector, and the network access controller are contained in a single encapsulated assembly.

12. The secure reader of claim 1, wherein the microcontroller is further configured to negotiate a certificate of authority with the financial transaction processing server.

13. The secure reader of claim 12, wherein the microcontroller is further configured to store at least one certificate of authority.

* * * * *